United States Patent
Do et al.

(10) Patent No.: US 9,042,531 B2
(45) Date of Patent: *May 26, 2015

(54) SYSTEMS AND METHODS FOR COMMUNICATION PROTOCOL MAPPING

(71) Applicant: BlackBerry Limited, Waterloo (CA)

(72) Inventors: Tu Dien Do, Kanata (CA); Kapil Nayar, Kanata (CA); Dong Liu, Kanata (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/264,556

(22) Filed: Apr. 29, 2014

(65) Prior Publication Data

US 2014/0233714 A1  Aug. 21, 2014

Related U.S. Application Data

(63) Continuation of application No. 13/365,584, filed on Feb. 3, 2012, now Pat. No. 8,750,474.

(60) Provisional application No. 61/557,651, filed on Nov. 9, 2011.

(51) Int. Cl.
*H04M 11/00* (2006.01)
*H04N 1/00* (2006.01)
(Continued)

(52) U.S. Cl.
CPC .............. *H04N 1/0022* (2013.01); *H04L 67/02* (2013.01); *H04L 69/08* (2013.01); *H04M 11/00* (2013.01)

(58) Field of Classification Search
CPC ..... G06F 3/1288; G06F 3/1285; H04M 7/125
USPC ..................... 379/100.01; 370/352
See application file for complete search history.

(56) References Cited

U.S. PATENT DOCUMENTS 6,108,406 A   8/2000 Mitchell et al.
6,496,865 B1  12/2002 Sumsion et al.
(Continued)

FOREIGN PATENT DOCUMENTS

WO   03061242       7/2003
WO   2004028090    4/2004
(Continued)

OTHER PUBLICATIONS

Rosenberg, J., Schulzrinne, H., Camarillo, G. Johnston, A., Peterson, J., Sparks, R., Handley, M., and E. Schooler, "SIP: Session Initiation Protocol", RFC 3261, Jun. 2002, total of 269 pages. Retreived from ftp://ftp.rfc-editor.org/in-notes/rfs3261.txt on Sep. 24, 2007.
(Continued)

*Primary Examiner* — Alexander Jamal
(74) *Attorney, Agent, or Firm* — Geoffrey deKleine; Borden Ladner Gervais LLP (57) ABSTRACT

Provided are systems and methods for communication protocol mapping. A first computing device uses a first communication protocol while a second computing device uses a second communication protocol. In some implementations, the first communication protocol and the second communication protocol are for different service domains. In accordance with an embodiment of the disclosure, a server is configured to map communication between the different service domains. In some implementations, the first communication protocol is a protocol conforming to Representational State Transfer 'REST' and the second communication protocol is a Session Initiation Protocol 'SIP'. In accordance with another embodiment of the disclosure, a server is configured to map communication between the protocol conforming to REST and SIP, regardless of whether different service domains are involved.

22 Claims, 4 Drawing Sheets (51) Int. Cl.
*H04L 29/08* (2006.01)
*H04L 29/06* (2006.01)

(56) References Cited

U.S. PATENT DOCUMENTS

| | | | |
|---|---|---|---|
| 6,549,937 | B1 | 4/2003 | Auerbach et al. |
| 6,594,700 | B1 | 7/2003 | Graham et al. |
| 6,757,722 | B2 | 6/2004 | Lonnfors et al. |
| 7,533,381 | B2 | 5/2009 | Ando |
| 7,584,244 | B2 | 9/2009 | Forstadius |
| 8,750,474 | B2 * | 6/2014 | Do et al. ............... 379/100.01 |
| 2002/0143641 | A1 | 10/2002 | Thomas et al. |
| 2004/0111525 | A1 | 6/2004 | Berkland et al. |
| 2004/0267942 | A1 | 12/2004 | Maes |
| 2005/0055577 | A1 | 3/2005 | Wesemann et al. |
| 2005/0083916 | A1 | 4/2005 | Itagaki et al. |
| 2005/0091362 | A1 | 4/2005 | Shigeta |
| 2005/0117183 | A1 | 6/2005 | Adlakha |
| 2006/0129646 | A1 | 6/2006 | Rhee et al. |
| 2006/0140199 | A1 | 6/2006 | Ma et al. |
| 2006/0190526 | A1 | 8/2006 | Neil |
| 2006/0190569 | A1 | 8/2006 | Neil et al. |
| 2006/0195613 | A1 | 8/2006 | Aizu et al. |
| 2007/0067471 | A1 | 3/2007 | Wolfe et al. |
| 2008/0250430 | A1 | 10/2008 | Salgado |
| 2009/0006637 | A1 | 1/2009 | George |
| 2009/0006638 | A1 | 1/2009 | George |
| 2009/0265434 | A1 | 10/2009 | Benc et al. |
| 2010/0259788 | A1 | 10/2010 | Sakuda et al. |
| 2010/0309508 | A1 * | 12/2010 | Kamath et al. ............... 358/1.15 |
| 2010/0325609 | A1 | 12/2010 | Windley |
| 2012/0176964 | A1 * | 7/2012 | Cai et al. ............... 370/328 |
| 2013/0125228 | A1 * | 5/2013 | Do et al. ............... 726/9 |

FOREIGN PATENT DOCUMENTS

| | | |
|---|---|---|
| WO | 2005032090 | 4/2005 |
| WO | 2006071468 | 7/2006 |

OTHER PUBLICATIONS

JAVA Telephony Specification (JTAPI) 1.3, total of 1191 pages. Retrieved from http://java.sun.com/products/jtapi/index.jsp on Jun. 13, 2007.
Voice Browser Call Control: CCXML Version 1.0 total of 205 pages. Retrieved from http://www.w3.org/TR/ccxml on Jun. 13, 2007.
Bushmitch, Dennis; Papageorgiou, Vasilis; A SIP-Based Device Communication Service for OSGi Framework; First IEEE Consumer Communications and Networking Conference, Jan. 2004, pp. 453-458.
Supplementary European Search Report for European Patent Application No. 07855563.8, dated Jul. 16, 2009.
Office Action dated Oct. 1, 2010 from related U.S. Appl. No. 11/961,413.
European Search Report and European Search Opinion dated Nov. 30, 2009 from related European Patent Application No. 07855562.0.
English-language translation of an Office Action dated Aug. 24, 2011 from related Chinese Patent Application No. 200780036636.X.
Office Action dated Oct. 23, 2009 from related U.S. Appl. No. 11/961,374.
Office Action dated Oct. 6, 2010 from related U.S. Appl. No. 11/961,374.
Office Action dated Sep. 25, 2009 from related U.S. Appl. No. 11/961,413.
Heidi-Maria Rissanen et al: "Design and Implementation of a RESTful IMS API", Wireless and Mobile Communications (ICWMC), 2010 6th International Conference ON, IEEE, Piscataway, NJ, USA, Sep. 20, 2010, pp. 86-91, XP031795973, ISBN: 978-1-244-8021-0.
Jain M et al: "The IMS 2.0 Service Architecture", Next Generation Mobile Applications, Services and Technologies, 2008. NGMAST '08. The Second International Conference ON, IEEE, Piscataway, NJ, USA, Sep. 16, 2008, pp. 3-9, XP031409648, ISBN: 978-0-7695-3333-9.
Extended European Search Report dated Feb. 22, 2013 from European Application No. EP 12 15 3949.

* cited by examiner

SYSTEMS AND METHODS FOR COMMUNICATION PROTOCOL MAPPING

RELATED APPLICATIONS

This application is a continuation of U.S. patent application Ser. No. 13/365,584 filed Feb. 3, 2012 and claims the benefit of U.S. Provisional Patent Application Ser. No. 61/557,651 filed Nov. 9, 2011. Both of these disclosures are incorporated by reference in their entirety.

FIELD OF THE DISCLOSURE

This disclosure relates to computing devices, and more particularly to communication protocols.

BACKGROUND

Computing devices are programmable machines capable of carrying out a sequence of arithmetic or logical operations. Some computing devices are capable of communicating with other devices. Such communication might adhere to a communication protocol. There are many communication protocols in existence for various types of communication.

Session Initiation Protocol (SIP) is a signalling protocol used for controlling communication sessions such as voice and video calls over Internet Protocol (IP). Computing devices might use SIP for various telephony signalling services.

Representational State Transfer (REST) is a software architecture style used for identifying, manipulating and transferring resource states through client-server communication. REST is stateless and is typically based on Hypertext Transfer Protocol (HTTP). Computing devices might use a RESTful protocol for various other services.

BRIEF DESCRIPTION OF THE DRAWINGS

Embodiments of the disclosure will now be described with reference to the attached drawings in which.

DETAILED DESCRIPTION OF EMBODIMENTS

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

According to an aspect of the disclosure, there is provided a method for execution by a server, the method comprising: mapping communication from a first communication protocol used by a first computing device to a second communication protocol used by a second computing device; wherein: the first communication protocol is for a printer service domain and the second communication protocol is for a telephony signalling service domain; and mapping the communication comprises mapping communication for the first computing device to electronically print a document onto the second computing device.

According to another aspect of the disclosure, there is provided a non-transitory computer readable medium having stored thereon computer-executable instructions that when executed on a processor of a server implement the method summarised above.

According to another aspect of the disclosure, there is provided a server comprising: a processor; and a protocol mapping function configured for mapping communication from a first communication protocol used by a first computing device to a second communication protocol used by a second computing device; wherein: the first communication protocol is for a printer service domain and the second communication protocol is for a telephony signalling service domain; and mapping the communication comprises mapping communication for the first computing device to electronically print a document onto the second computing device.

According to another aspect of the disclosure, there is provided a method for execution by a server, the method comprising: mapping communication from a first communication protocol used by a first computing device to a second communication protocol used by a second computing device; wherein: the first communication protocol is a protocol conforming to Representational State Transfer 'REST' and the second communication protocol is a Session Initiation Protocol 'SIP'; and mapping the communication comprises mapping communication for the first computing device to electronically print a document onto the second computing device.

According to another aspect of the disclosure, there is provided a non-transitory computer readable medium having stored thereon computer-executable instructions that when executed on a processor of a server implement the method summarised above.

According to another aspect of the disclosure, there is provided a server comprising: a processor; and a protocol mapping function configured for mapping communication from a first communication protocol used by a first computing device to a second communication protocol used by a second computing device; wherein: the first communication protocol is a protocol conforming to Representational State Transfer 'REST' and the second communication protocol is a Session Initiation Protocol 'SIP'; and mapping the communication comprises mapping communication for the first computing device to electronically print a document onto the second computing device.

Other aspects and features of the present disclosure will become apparent, to those ordinarily skilled in the art, upon review of the following description of the specific embodiments of the invention.

System for Protocol Mapping

Figure 1:
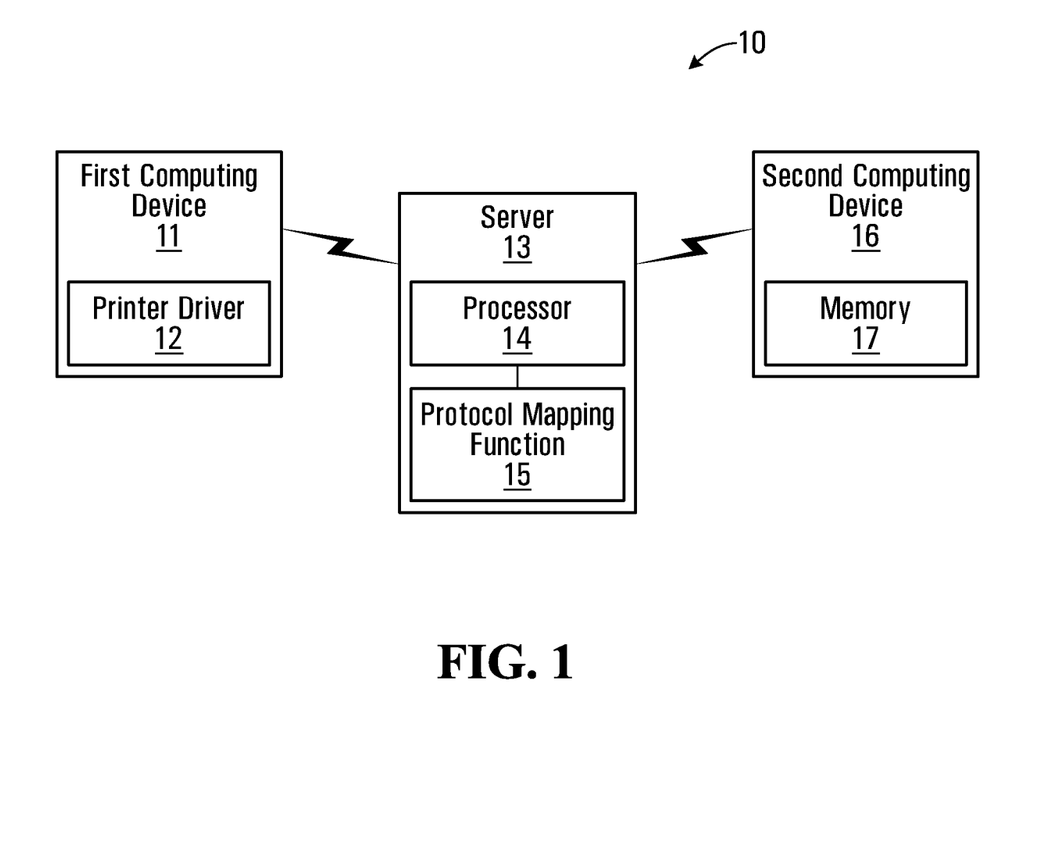
FIG. 1 is a block diagram of an example communication system featuring a server and two computing devices.

Referring now to FIG. 1, shown is a block diagram of an example communication system 10 featuring a server 13 and two computing devices 11,16. The server 13 has a processor 14, a protocol mapping function 15, and may have other components that are not shown. The computing devices 11,16 are shown with specific components 12,17 as will be described below, but might have alternative components as will also be described below. The communication system 10 may have other computing devices and other components, but they are not shown for simplicity.

The server 13 might be part of a network (not shown). The network might for example be a wireless network in which case the computing devices 11,16 might be wireless devices. Note that the wireless network may include wires in spite of having components for wireless communication. Example wireless networks are provided below with reference to FIG. 4. Alternatively, the network might be a wired network. In any event, the network facilitates communication between the server 13 and the computing devices 11,16.

The operation of the communication system 10 will now be described by way of example. In this example it is assumed that the first computing device 11 is to electronically print a document onto the second computing device 16. To this end, the first computing device 11 has a printer driver 12 capable of generating an electronic file such as a Portable Document Format (PDF) file, a PostScript (PS) file, etc. Also, the second computing device 16 has a memory 17 capable of storing the electronic file. Note that the electronic printing does not require any printing on physical paper.

The first computing device 11 uses a first communication protocol for a printer service domain while the second computing device 16 uses a second communication protocol for a telephony signalling service domain. Therefore, the first communication protocol and the second communication protocol are for different service domains.

In accordance with an embodiment of the disclosure, the protocol mapping function 15 of the server 13 is configured to map communication from the different service domains. Therefore, the electronic printing from the first computing device 11 onto the second computing device 16 can be accomplished even though the second computing device uses the second communication protocol, which is for the telephony signalling service domain and not the printer service domain. The first communication protocol (e.g. RESTful HTTP) models a resource (i.e. the electronic file to be transferred from the first computing device 11 to the second computing device 16), and the second communication protocol (e.g. SIP) extends that model through a real time session established with the second computing device 16.

In some implementations, each service domain is linked to a specific domain name on a specific server. Through a domain name the user can access the server and therefore the service for that domain. Different service domains have different domain names used for accessing service. In this example, the first computing device 11 would connect to a server in the printer service domain, and the second computing device 16 would connect to a server running SIP in the telephony signalling service domain. In a specific example, the first computing device 11 is a Personal Computer (PC) using a RESTful protocol (e.g. based on HTTP) for the printer service domain and the second computing device 16 is a tablet computer using SIP for the telephony signalling service domain. Other types of computing devices and communication protocols for different service domains are possible and are within the scope of the disclosure.

The illustrated example focuses on protocol mapping between two specific service domains, namely the printer service domain and the telephony signalling service domain. However, it is to be understood that protocol mapping between other different service domains is possible and within the scope of this disclosure. For example, beside the printer service domain, other possible service domains could include a social networking services domain (e.g. for sharing information such as messages, music, pictures, etc.), or an emergency services domain (e.g. for providing notifications such as paging alerts, etc.). One or more of these service domains could be provided on one side while the telephony signalling service domain is on the other side. Note that for such alternative protocol mapping, the computing devices 11,16 may have alternative components. For example, instead of having the printer driver 12, the first computing device 11 might have one or more alternative components for another service domain. Also note that implementations may depend upon protocol support available for a particular domain (e.g. social networking services domain or emergency services domain) and might involve a messaging protocol such as Java Message Service (JMS), REST, SIP, etc.

Protocol mapping between the different service domains might for example involve a RESTful protocol (e.g. based on HTTP) on one side and SIP on the other side, or other protocols. However, it is noted that protocol mapping between a RESTful protocol and SIP is not limited to different service domains, let alone the different service domains described above. Therefore, in accordance with another embodiment of the of the disclosure, the protocol mapping function 15 of the server 13 is configured to map communication between a RESTful protocol and SIP, regardless of whether different service domains are involved. In some implementations, the mapping involves the printer service domain and the telephony signalling service domain as described above. In alternative implementations, the mapping involves other service domains, examples of which have been mentioned above.

In some implementations, the server 13 maintains a protocol mapping between the first communication protocol used by the first computing device 11 and the second communication protocol used by the second computing device 16. In alternative implementations, the mapping is calculated by other means and does not rely on any protocol mapping that has been maintained on the server 13.

In the illustrated example, the protocol mapping function 15 is implemented as software and is executed by the processor 14. However, more generally, the protocol mapping function 15 may be implemented as software, hardware, firmware, or any appropriate combination thereof.

Further details of the protocol mapping are provided below with reference to FIGS. 2 and 3.

Method for Protocol Mapping

Figure 2:
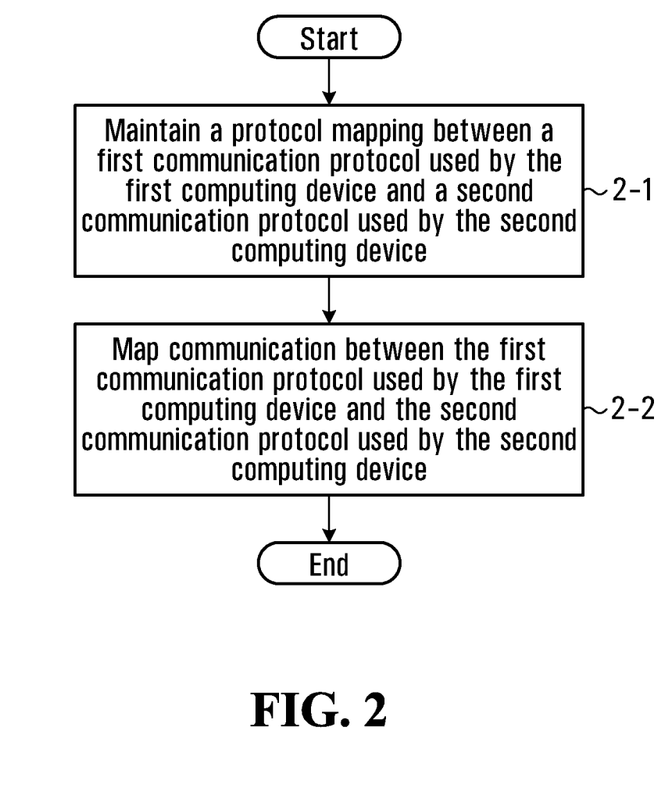
FIG. 2 is a flowchart of an example method of mapping communication between two computing devices.

Referring now to FIG. 2, shown is a flowchart of an example method of mapping communication between two computing devices. This method may be implemented in a server of a communication system, for example by the protocol mapping function 15 of the server 13 shown in FIG. 1. More generally, this method may be implemented in any appropriate apparatus.

In some implementations, as shown at step 2-1, the server maintains a protocol mapping between a first communication protocol used by the first computing device and a second communication protocol used by the second computing device. In some implementations, the protocol mapping provides a mapping for communication between different service domains. In one example, the first communication protocol is for a printer service domain, and the second communication protocol is for a telephony signalling service domain.

In accordance with an embodiment of the disclosure, as shown at step 2-2, the server maps communication between the first communication protocol used by the first computing device and the second communication protocol used by the second computing device. Therefore, the server performs mapping for communication between the different service domains. In some implementations, this mapping is performed based on the protocol mapping maintained at step 2-1. In alternative implementations, the mapping is calculated by other means and does not rely on any protocol mapping that has been maintained on the server.

There are many possibilities for the different service domains. In some implementations, the first communication protocol is for a printer service domain, and the second communication protocol is for a telephony signalling service domain. In specific implementations, the first communication protocol is a RESTful protocol (e.g. based on HTTP) for the printer service domain, and the second communication protocol is a SIP for the telephony signalling service domain. For such implementations, the server might for example map communication for the first computing device to electronically "print" a document onto the second computing device.

Note that the electronic printing does not require any printing on physical paper, but rather involves generating an electronic file (e.g. PDF-file, PS-file, etc.) to be stored on the second computing device. Accomplishing the electronic printing from the first computing device onto the second computing device even though the second computing device uses SIP, which is for the telephony signalling service domain and not the printer service domain, can be accomplished by various embodiments disclosed herein.

It is to be understood that other different service domains are possible and are within the scope of this disclosure. Examples have been provided above and are therefore not repeated here.

Protocol mapping between the different service domains might for example involve a RESTful protocol (e.g. based on HTTP) on one side and SIP on the other side, or other protocols. However, it is noted that protocol mapping between a RESTful protocol and SIP is not limited to different service domains, let alone the different service domains described above. Therefore, in accordance with an another embodiment of the of the disclosure, the server at step 2-2 maps communication between a RESTful protocol and SIP, regardless of whether different service domains are involved. In some implementations, the mapping involves the printer service domain and the telephony signalling service domain as described above. In alternative implementations, the mapping involves other service domains, examples of which have been mentioned above.

Example Protocol Mapping

Figure 3:
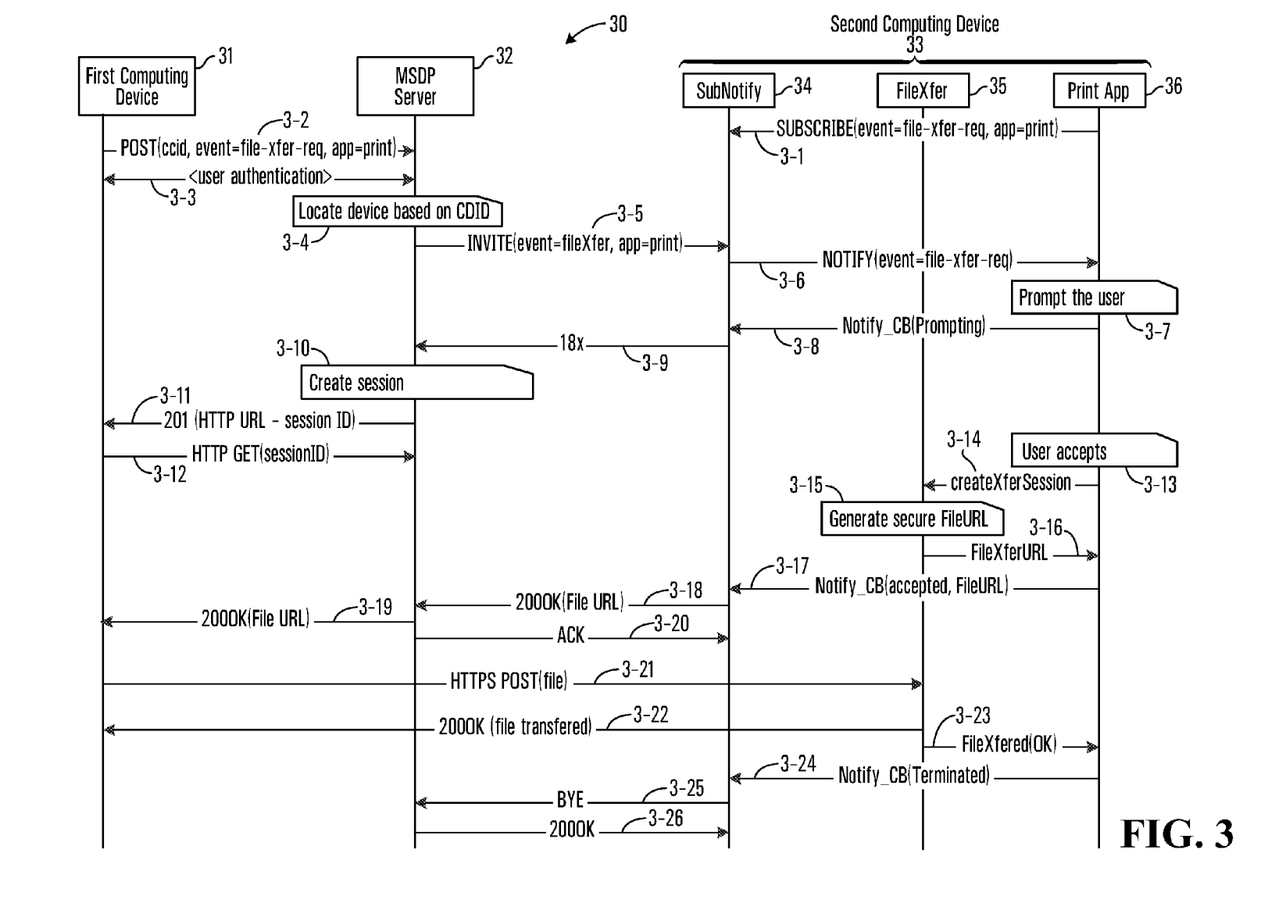
FIG. 3 is a signalling diagram showing example details of communication protocol mapping between two between two computing devices.

Referring now to FIG. 3, shown is a signalling diagram showing example details of communication protocol mapping between two between two computing devices 31,33. The signalling is shown for a specific scenario, namely the first computing device 31 electronically printing a document onto the second computing device 33. However, it is to be understood that other scenarios are possible and are within the scope of the disclosure. Furthermore, it is to be understood that the signalling diagram is very specific and is provided only as an example.

In this example a user might use both the first computing device 31 and the second computing device 33. In a specific example, the first computing device 11 is a PC and the second computing device 16 is a tablet computer, and the user wishes to electronically print a document onto the tablet computer from the PC. Once electronically printed on the tablet computer, the user has the electronic document on the tablet computer and take it with them.

The second computing device 33 has a Print Application 36, which at step 3-1 subscribes to a Sub Notify component 34, which functions as a communication liaison for applications such as the Print Application 36 running on the second computing device 33. Once subscribed, the Print Application 36 is capable of communicating outside of the second computing device 33.

The first computing device 31 has a printer driver (not shown). At step 3-2, the first computing device 31 sends a request to a Mobile Service Delivery Platform (MSDP) server 32 to electronically print a document on the second computing device 33. Note that the request adheres to REST and includes a Computing Device Identifier (CCID) identifying the second computing device 33 as a target for the electronic document. At step 3-3, there is user authentication, which can help to prevent malicious users from sending electronic documents to the second computing device 33.

Upon user authentication, at step 3-4 the MSDP server 32 locates the second computing device 33 using the CCID from the request received at step 3-2. It is assumed that the second computing device 33 previously registered (step not shown) with the MSDP server 32 and therefore there is a Transmission Control Protocol (TCP) connection between the MSDP server 32 and the second computing device 33. The CCID is used to map onto this TCP connection.

Upon locating the second computing device 33, at step 3-5 the MSDP server 32 requests a file transfer call, which is a packet-switched session used to transfer the electronic document from the first computing device 31 to the second computing device 33. The request adheres to SIP, which is a protocol for the telephony signalling service domain, but identifies that the request in respect of the printer service domain. Note that the MSDP server 32 uses SIP because this signaling channel is already maintained between the MSDP server 32 and applications on the second computing device 33 including the Print Application 36.

Upon receiving the request, at step 3-6 the Sub Notify component 34 notifies the Print Application 36 that there is a request to electronically print a document on the second computing device 33. The Print Application 36 notifies the user at step 3-7 and requests the user to accept the request.

At step 3-8, the Print Application 36 notifies the Sub Notify component 34 that the user has been prompted. In response, the Sub Notify component 34 sends a corresponding message to the MSDP server 32 at step 3-9.

Upon receiving the corresponding message, the MSDP server 32 creates the session at step 3-10. Note that the session is created without waiting for the user to accept the request. Since REST is stateless, the MSDP server 32 does not set a timer in order to wait for the user to accept the request, as the timer would not be stateless.

At step 3-11, the MSDP server 32 sends a message to the first computing device 31 informing that the session has been created and indicating its session ID. At this point, the first computing device 31 does not know whether the user has accepted the request. Also, according to REST, the computing device 31 should not wait. Therefore, at step 3-12 the first computing device 31 requests a status update. In this manner, for a "state transition" within the call setup procedure, the first computing device 31 is directed to a long-lived HTTP GET on a resource (i.e. waiting the resource status change, or transition to the next state).

In the meantime, at step 3-13 the user accepts the request to transfer the electronic document. Therefore, at step 3-14 the Print Application 36 sends a request to a File Transfer component 35 in order to create a file Uniform Resource Locator (URL) that can be used to transfer the electronic document. In response, the File Transfer component 35 generates a secure file URL at step 3-15, and then conveys this back to the Print Application 36 at step 3-16.

At step 3-17, the Print Application 36 notifies the Sub Notify component 34 that the user has accepted the request to transfer the electronic document. Note that this signal identifies the file URL that was generated at step 3-15. In response, the Sub Notify component 34 sends a corresponding message at step 3-18 to the SDP server 32, which in turn forwards a corresponding message to the first computing device 31 at step 3-19. Note that the signal at steps 3-18 is based on SIP while the signal at step 3-19 is based on RESTful HTTP and therefore the signals are different from one another even though they both carry the file URL. At step 3-20 the MSDP server 32 acknowledges receipt of the file URL.

At this point the first computing device 31 has the file URL and can therefore transfer the electronic document. At step 3-21, the first computing device 31 uses the file URL to transfer the electronic document to the second computing device 33. The electronic document is received by the File Transfer component 35 of the second computing device 33. In response, the File Transfer component 35 acknowledges receipt of the electronic document at step 3-22. The File Transfer component 35 also informs the Print Application 36 at step 3-23 that the electronic document has been received.

At this point the second computing device 33 has the electronic document and so the session used to transfer the electronic document is no longer needed. Therefore, at step 3-24 the Print Application 36 notifies the Sub Notify component 34 that the session should be terminated. In response, the Sub Notify component 34 sends a command to the MSDP server 32 to end the session. The MSDP server 32 ends the session (step not shown) and confirms the same at step 3-26. Alternatively, the session is terminated by the first computing device 31 sending an HTTP DELETE, which is mapped to BYE over SIP.

In this example, it can be seen that the MSDP server 32 offers a RESTful interface to the printer driver 12 running on the first computing device 11. Therefore, the electronic printing from the first computing device 31 onto the second computing device 33 is accomplished even though the second computing device 33 uses SIP, which is for the telephony signalling service domain and not the printer service domain. Various RESTful operations can be mapped to SIP to allow things like "discover of the second computing device", "prompt the user to accept the file transfer", "wait for the response before proceeding", "cancel the transfer operation", "end the session when file transfer finishes", etc. RESTful API's are by nature request/response (with a short timeout) and stateless. Embodiments of the disclosure provide a mechanism to map the RESTful Print API into SIP "session" and signaling procedures for the file transfer.

Computer Readable Medium

In accordance with another embodiment of the disclosure, there is provided a non-transitory computer readable medium having computer executable instructions stored thereon for execution on a processor of a server so as to implement any of the methods described herein. The non-transitory computer readable medium might for example be an optical disk such as a Compact Disk (CD), a Digital Video Disk (DVD), or a Blu-Ray Disk (BD). Alternatively, the non-transitory computer readable medium might for example be a memory stick, a memory card, a disk drive, a solid state drive, etc. Other non-transitory computer readable media are possible and are within the scope of this disclosure. More generally, the non-transitory computer readable medium can be any tangible medium in which the computer executable instructions can be stored.

Example Computing Device

Figure 4:
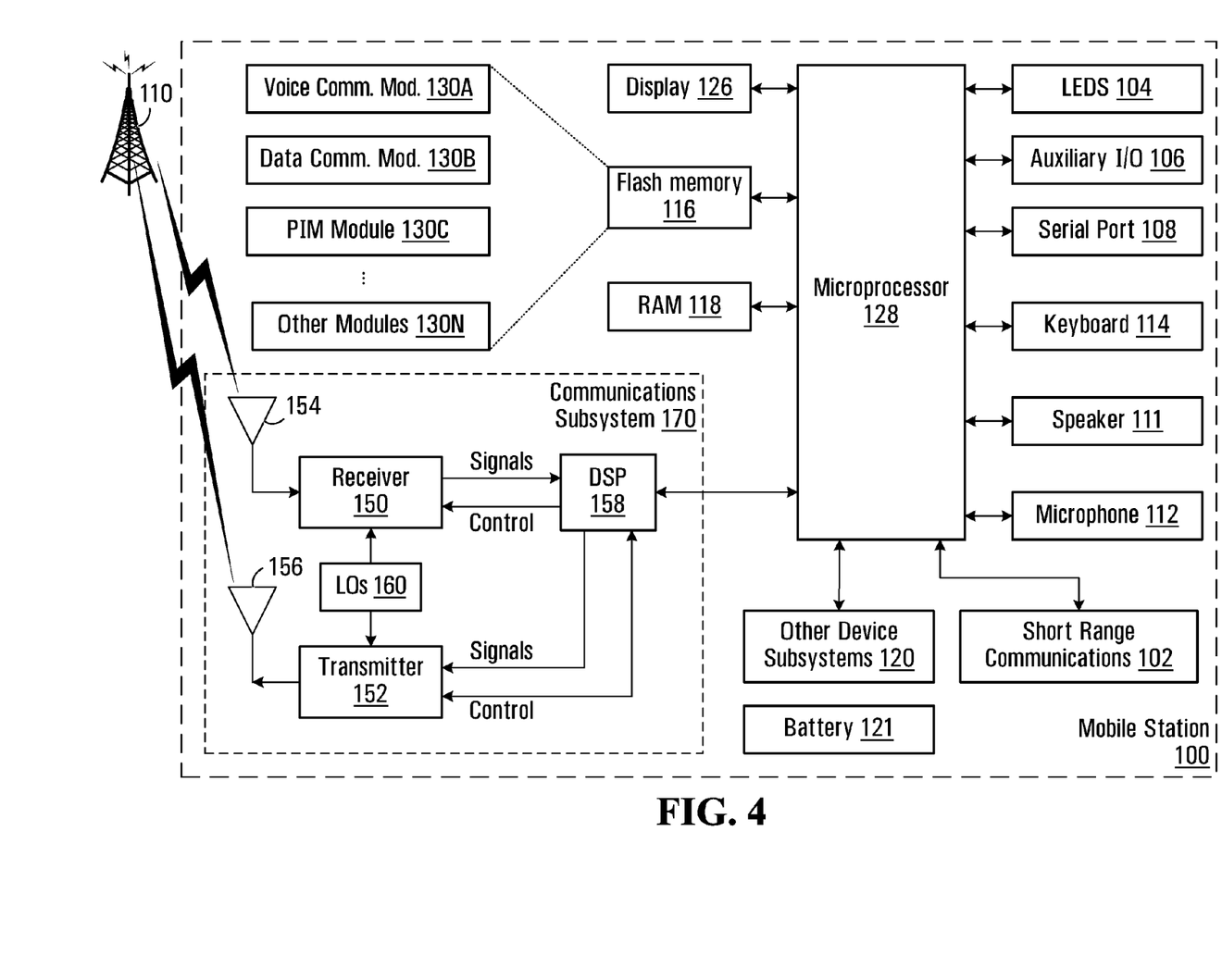
FIG. 4 is a block diagram of an example computing device.

Referring now to FIG. 4, shown is a block diagram of an example computing device 100. In this example, the computing device 100 is a mobile device 100. However, as noted above, other types of computing devices are possible (e.g. PC, tablet computer, etc.) and are within the scope of the disclosure. It is to be understood that the mobile device 100 is shown with very specific details and is provided only as an example.

The mobile device 100 has a housing that may be elongated vertically, or may take on other sizes and shapes (including clamshell housing structures). The keyboard 114 may include a mode selection key, or other hardware or software for switching between text entry and telephony entry. Alternatively, the mobile device 100 may have a housing that does not take on other sizes and shapes.

A microprocessor 128 is shown schematically as coupled between a keyboard 114 and a display 126. The microprocessor 128 is a type of processor. The microprocessor 128 controls operation of the display 126, as well as overall operation of the mobile device 100, in response to actuation of keys on the keyboard 114 by a user.

In addition to the microprocessor 128, other parts of the mobile device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 100 may have a battery 121 to power the active elements of the mobile device 100. The mobile device 100 is in some embodiments a two-way radio frequency (RF) communication device having voice and data communication capabilities. In addition, the mobile device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. Additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152, a GPS receiver 162, and one or more antennas, illustrated as a receive antenna 154, a transmit antenna 156, and a GPS antenna 164. In addition, the communication subsystem 170 also includes a processing module, such as a digital signal processor (DSP) 158, and local oscillators (LOs) 160.

The specific design and implementation of the communication subsystem 170 might be dependent upon the communication network in which the mobile device 100 is intended to operate. The communication network might be a cellular network. For example, the communication subsystem 170 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1X and 1x EV-DO, and Wideband CDMA. Other applicable communication networks might include packet data systems, Enhanced Data rates for GSM Evolution (EDGE), E-EDGE, UMTS/UTRAN, OFDMA systems, TD-SCDMA systems, LTE/E-UTRAN, etc. The communication subsystem 170 may also be designed to operate with a non-cellular network such as an 802.11 Wi-Fi network or an 802.16 WiMAX network or both. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150, the transmitter 152, and the GPS receiver 162. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 or some other auxiliary I/O device 106, such as a touchpad, a rocker switch, a thumbwheel, or some other type of input device, or combinations thereof. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

Location determination using GPS technology involves receiving GPS signals from GPS satellites 166 on the antenna 164. The GPS signals are received using the GPS receiver 162 and processed by the DSP 158. Typically, GPS signals from at least four satellites are processed. Further details of GPS are omitted for simplicity.

The short-range communications subsystem 102 enables communication between the mobile device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

Numerous modifications and variations of the present disclosure are possible in light of the above teachings. It is therefore to be understood that within the scope of the appended claims, the disclosure may be practised otherwise than as specifically described herein.

We claim:

1. A method for execution by a server, the method comprising:
    mapping communication from a first communication protocol used by a first computing device to a second communication protocol used by a second computing device;
    wherein:
    the first communication protocol is for a printer service domain and the second communication protocol is for a telephony signalling service domain; and
    mapping the communication comprises mapping communication for the first computing device to electronically print a document onto the second computing device.

2. The method of claim 1, wherein:
    the first communication protocol is a protocol conforming to Representational State Transfer 'REST' for the printer service domain.

3. The method of claim 1, wherein:
    the second communication protocol is a Session Initiation Protocol 'SIP' for the telephony signalling service domain.

4. The method of claim 1, wherein mapping communication for the first computing device to electronically print a document onto the second computing device comprises:
    mapping communication for the first computing device to transfer a Portable Document Format 'PDF' file or a PostScript 'PS' file onto the second computing device.

5. The method of claim 1, wherein mapping communication comprises:
    offering a RESTful interface to a printer driver running on the first computing device.

6. The method of claim 5, wherein offering the RESTful interface enables one or more of:
  discovery of the second computing device;
  prompting a user to accept a file transfer;
  waiting for a response before proceeding with the file transfer;
  canceling the file transfer; and
  ending a session when file transfer finishes.

7. The method of claim 1, further comprising:
  maintaining a protocol mapping between the first communication protocol and the second communication protocol.

8. A non-transitory computer readable medium having stored thereon computer-executable instructions that when executed on a processor of a server implement the method of claim 1.

9. A server comprising:
  a processor; and
  a protocol mapping function configured for mapping communication from a first communication protocol used by a first computing device to a second communication protocol used by a second computing device;
  wherein:
  the first communication protocol is for a printer service domain and the second communication protocol is for a telephony signalling service domain; and
  mapping the communication comprises mapping communication for the first computing device to electronically print a document onto the second computing device.

10. The server of claim 9, wherein:
  the first communication protocol is a protocol conforming to Representational State Transfer 'REST' for the printer service domain.

11. The server of claim 9, wherein:
  the second communication protocol is a Session Initiation Protocol 'SIP' for the telephony signalling service domain.

12. The server of claim 9, wherein the protocol mapping function is configured for mapping communication for the first computing device to electronically print a document onto the second computing device by:
  mapping communication for the first computing device to transfer a Portable Document Format 'PDF' file or a PostScript 'PS' file onto the second computing device.

13. The server of claim 9, wherein the protocol mapping function is configured for mapping communication by:
  offering a RESTful interface to a printer driver running on the first computing device.

14. The server of claim 13, wherein the protocol mapping function is configured for offering the RESTful interface by enabling one or more of:
  discovery of the second computing device;
  prompting a user to accept a file transfer;
  waiting for a response before proceeding with the file transfer;
  canceling the file transfer; and
  ending a session when file transfer finishes.

15. The server of claim 9, wherein the protocol mapping function is further configured for:
  maintaining a protocol mapping between the first communication protocol and the second communication protocol.

16. The server of claim 9, wherein the server is a Mobile Service Delivery Platform 'MSDP' server.

17. A method for execution by a server, the method comprising:
  mapping communication from a first communication protocol used by a first computing device to a second communication protocol used by a second computing device;
  wherein:
  the first communication protocol is a protocol conforming to Representational State Transfer 'REST' and the second communication protocol is a Session Initiation Protocol 'SIP'; and
  mapping the communication comprises mapping communication for the first computing device to electronically print a document onto the second computing device.

18. The method of claim 17, wherein the first communication protocol and the second communication protocol used in the mapping are for different service domains.

19. The method of claim 18, wherein the first communication protocol is for a printer service domain and the second communication protocol is for a telephony signalling service domain.

20. The method of claim 17, further comprising:
  maintaining a protocol mapping between the first communication protocol and the second communication protocol.

21. A non-transitory computer readable medium having stored thereon computer-executable instructions that when executed on a processor of a server implement the method of claim 17.

22. A server comprising:
  a processor; and
  a protocol mapping function configured for mapping communication from a first communication protocol used by a first computing device to a second communication protocol used by a second computing device;
  wherein:
  the first communication protocol is a protocol conforming to Representational State Transfer 'REST' and the second communication protocol is a Session Initiation Protocol 'SIP'; and
  mapping the communication comprises mapping communication for the first computing device to electronically print a document onto the second computing device.

* * * * *